United States Patent

[11] 3,617,078

| [72] | Inventor | Jonas Valukonis<br>Detroit, Mich. |
|---|---|---|
| [21] | Appl. No. | 864,441 |
| [22] | Filed | Oct. 7, 1969 |
| [45] | Patented | Nov. 2, 1971 |
| [73] | Assignee | Ford Motor Company<br>Dearborn, Mich. |

[54] ADJUSTABLE TIE ROD LINKAGE
11 Claims, 3 Drawing Figs.

[52] U.S. Cl. .................................................. 287/104, 74/586
[51] Int. Cl. ..................................................... F16b 7/00
[50] Field of Search .......................................... 74/586; 287/65, 104

[56] References Cited
UNITED STATES PATENTS

| 1,535,293 | 4/1925 | Collins | 287/104 |
|---|---|---|---|
| 1,682,895 | 9/1928 | Dillon | 287/104 |
| 1,972,653 | 9/1934 | Hart | 287/104 |
| 2,013,283 | 9/1935 | Merrill | 287/104 |
| 3,496,800 | 2/1970 | Brezinski | 74/586 |

Primary Examiner—William F. O'Dea
Assistant Examiner—F. D. Shoemaker
Attorneys—John R. Faulkner and Clifford L. Sadler ABSTRACT: An adjustable tie rod assembly for a vehicle steering linkage system is constructed by forming transverse serrations near the ends of each of two rod sections or elements. Each rod section has a lock-receiving notch spaced from its serrated portion. The rod sections are placed together with the serrations of one in alignment with the lock-receiving notch of the other. A cylindrical retainer surrounds the rods and a pair of soft metal locking inserts are driven through openings in the retainer. An insert is received in each locking notch and is deformed into engagement with the adjacent serrations. The ends of the inserts are upset to prevent their displacement.

PATENTED NOV 2 1971 3,617,078

INVENTOR
JONAS VALUKONIS
BY John R. Faulkner
Clifford L. Sadler
ATTORNEYS

ADJUSTABLE TIE ROD LINKAGE

BACKGROUND OF THE INVENTION

This invention relates generally to tie rod assemblies for vehicle steering linkage systems, and more particularly to improved adjusting means therefor.

Tie rod assemblies conventionally employ so-called turn buckle adjustment means in which opposite hand internal threads are formed on opposite ends of a sleeve member which threadably engage corresponding threads on associated rod elements. Adjustment of the overall length of the tie rod is accomplished by rotating the sleeve in an appropriate direction. When the desired length is obtained, the sleeve is contracted into clamping engagement with the rod element by suitable bolt means.

While arrangements of this type perform adequately in initially establishing and maintaining the desired degree of wheel toe-in in a vehicle suspension and steering linkage arrangement, in some cases space limitations may be critical to the extent that random rotational positioning of the turn buckle may cause interference between the locking bolts and adjacent portions of the vehicle. In addition, such constructions involve a multiplicity of threaded elements further complicated by the necessities of applying both left- and right-hand threads.

BRIEF SUMMARY OF THE DISCLOSURE

In view of the difficulties as outlined above with respect to prior art constructions, it is the principal object of the present invention to provide a simple, inexpensive adjustable linkage joint for tie rod assemblies for steering linkages.

In the preferred embodiment, the tie rod assembly comprises first and second rod sections or elements having mating ends. Each rod has a serrated portion and a lock-receiving portion or notch spaced therefrom. The rod ends are placed together with the serrations of one in alignment with the lock-receiving portion of the other. A cylindrical retaining sleeve surrounds the rod ends. A soft metal insert passes through openings in the sleeve and through the lock-receiving portion or notch of each of the rods. Each insert is formed of soft metal such as aluminum so that when it is driven into place it deforms into engagement with the serrated surface disposed adjacent to the locking notch.

Each insert has an enlarged head end that is driven into position against the side of the sleeve. The shank of the insert is seated in the locking notch and into deformed engagement with the serrations of the opposite rod. The opposite end of the insert protrudes from the other side of the sleeve and is bent over to secure it from dislocation.

BRIEF DESCRIPTION OF THE DRAWINGS

The many objects and advantages of the present invention become apparent upon consideration of the following detailed description and the accompanying drawings, in which.

DETAILED DESCRIPTION OF THE PREFERRED EMBODIMENT

Figure 1:
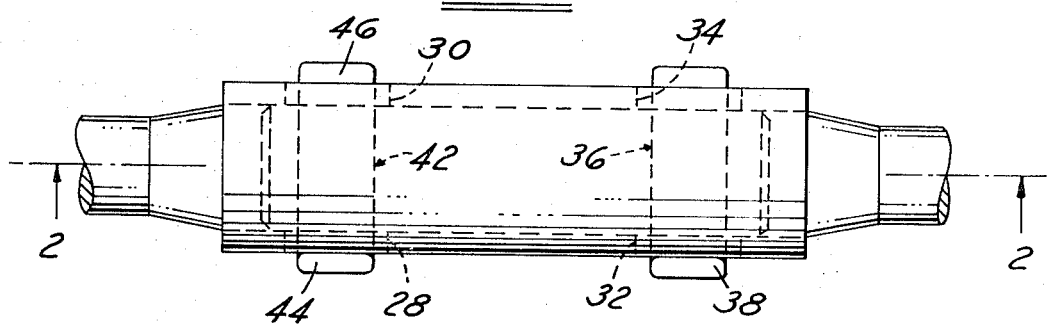
FIG. 1 is a top plan view of an adjustable tie rod linkage joint constructed in accordance with this invention.

Referring now to the drawings for a more detailed description of the present invention, FIG. 1 discloses a tie rod assembly for use in an automotive steering linkage system. The assembly includes a first rod 10 that is connected to the socket portion 12 of a ball and socket joint. The joint includes a ball stud member 14. It will be understood that the stud member 14 is adapted for connection with associated portions of the steering assembly in a conventional manner. The tie rod assembly includes a second rod 16, which is constructed to be secured to the first rod 10.

Figure 3:
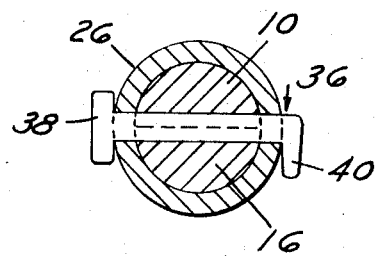
FIG. 3 is a sectional view taken along section lines 3—3 of FIG. 2.

Rod 10 is formed with a semicylindrical end construction. The rod 10 has a serrated portion 18 spaced from the end thereof. Near the end of the rod is a lock-receiving rectangular notch 20. In a similar manner, rod 16 has a semicylindrical end construction as seen in FIG. 3. The rod 16 is provided with a serrated portion 22 which is spaced from a lock-receiving notch 24.

In the assembled condition of the coupling, the serrations 18 of rod 10 are in general alignment with the lock receiving notch 24 of rod 16. Conversely, rectangular notch 20 of rod 10 is in alignment with the serrations 22 of rod 16.

A cylindrical retaining sleeve 26 surrounds the ends of the two rods 10 and 16. The sleeve 26 has a first pair of aligned openings 28 and 30 that are in general alignment with the notch 24. Similarly, a pair of aligned openings 32 and 34 of sleeve 26 are in alignment with the notch 20.

A soft metal locking insert 36 has an enlarged head end 38 and is constructed to be forcibly inserted through the opening 32 and through the notch 20. The shank of the insert 36 is thicker than the depth of the notch 20 so that it deformably engages the serrations 22. The insert 36 is driven through the notch 20 until the head 38 seats against the sleeve 26. The protruding end 40 of the insert is then bent over into a locking and retaining position.

In a similar fashion, an insert 42 is driven through the aligned holes 28 and 30 of the sleeve 26. The insert 42 is positioned in the notch 28 in biting engagement with the serrations 18 therein. The insert 42 has a head end 44 that is seated against the sleeve 26 and a bent over opposite end 46 to lock it in position.

OPERATION

After the rods 10 and 16 are assembled in the steering linkage system, their ends are placed together with the sleeve 26 encircling them. The rods 10 and 16 are adjusted axially in order to obtain the desired toe-in. The locking insert 36 is then driven through the openings 32 and 34 in the retaining sleeve 26.

First, the insert 36 is driven through the hole 32, which is in alignment with the notch 20. Because the insert 36 is of substantially greater thickness than the depth of the notch 20, it must be forcibly driven into position. This causes deformation of the insert when it engages the serrations 22 because it is made of soft metal such as aluminum. The serrations 22 engage the underside of the insert 36 with a biting action. When the insert 36 is positioned with the head 38 seated against the exterior surface of the sleeve 26, the end 40 is bent over to lock it in position.

In a similar fashion, the insert 42 is driven through the aligned holes 28 and 30 of the sleeve 26. It is positioned in the notch 28 in biting engagement with the serrations 18 of rod 10. The insert 42 has a head end 44 that is seated against the sleeve 26 and a bent over opposite end 46 to lock it in position.

Figure 2:
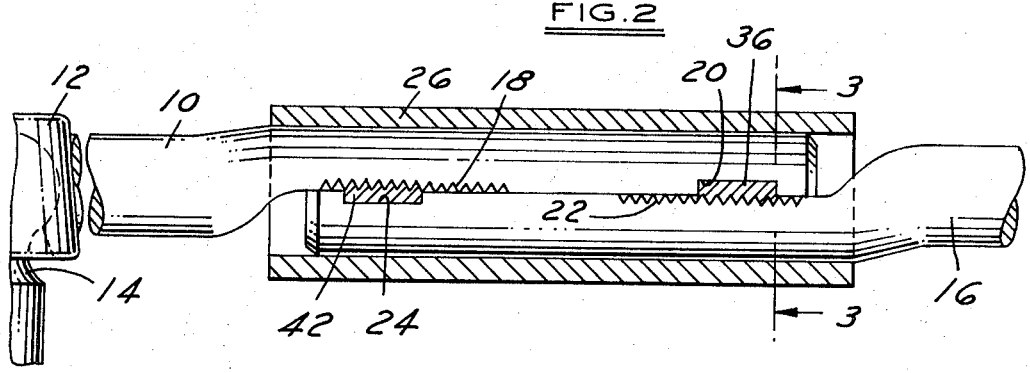
FIG. 2 is a side elevational view partly in section taken along section lines 2—2 of FIG. 1 and showing a portion of the steering linkage to which the tie rod is connected.

In order to accommodate the desired axial adjustment, the holes 32 and 34 of sleeve 26 are wider than the width of locking notch 20. A similar situation exists with respect to the holes 28 and 30 of sleeve 26 and the notch 24 of rod 16. Also, the serrations 18 and 22 have a greater extent than the width of the notches 20 and 24. This feature is illustrated in FIG. 2 and is designed to accommodate axial adjustment.

With the present invention, the tie rod portions 16 and 10 are positioned axially within the sleeve 26 and the soft metal inserts 36 and 42 are forcibly driven into position. Due to the presence of the surrounding tube 26, the joint is highly resistant to bending forces. Due to the fact that the inserts are seated in notches and in engagement with the serrated portions, the joint is strongly resistant to axial displacement. The joint is more than adequate to carry the forces present in a steering linkage system.

The foregoing description presents the presently preferred embodiment of the invention. Modifications and alterations may occur to those skilled in the art which will come within the scope and spirit of this invention.

I claim:

1. A rod assembly comprising a first rod, a second rod and means constructed to secure said rods together, each of said rods having a lock-receiving recess on its exterior surface, said lock-receiving recesses being arranged in juxtaposed relationship and defining a lock-receiving aperture, a locking means extending through said lock receiving aperture and in engagement with said recesses, said locking means being constructed to prevent axial displacement of said rods, retaining means engaging both of said rods and being constructed to prevent the radial displacement thereof, said locking means engaging said retaining means and being constructed to prevent its axial displacement.

2. A rod assembly comprising a first rod, a second rod and means constructed to secure said rods together, each of said rods having a lock-receiving portion, said lock receiving portions being juxtaposed, a locking means inserted between said lock-receiving portions and in engagement therewith, said locking means being constructed to prevent axial displacement of said rods, retaining means engaging both of said rods and being constructed to prevent radial displacement thereof, said locking means being formed of a material that is softer than the material of said rods.

3. A rod assembly according to claim 2 and including:
one of said lock receiving portions having an irregular surface engaging said locking means.

4. A rod assembly according to claim 2 and including:
said locking means engaging said retaining means and being constructed to prevent its axial displacement, one of said lock receiving portions having an irregular surface engaging said locking means.

5. A tie rod assembly for vehicle steering linkage comprising a first rod having a serrated surface, a second rod having a lock-receiving portion, locking means having a deformable shank portion engaging said lock-receiving portion of said second rod and said serrated portion of said first rod, said locking means being constructed to prevent axial displacement of said rods.

6. A tie rod assembly for vehicle steering linkage according to claim 5 and including:
retaining means engaging said rods and constructed to prevent their radial displacement, said locking means being constructed to prevent axial displacement of said retaining means.

7. A tie rod assembly for vehicle steering linkage according to claim 5 and including:
said first rod having a lock-receiving portion spaced from said serrated surface of said first rod, a second rod having a serrated surface spaced from said lock-receiving portion of said second rod, second locking means having a deformable shank portion engaging said lock-receiving portion of first rod and said serrated portion of said second rod, said second locking means being constructed to prevent axial displacement of said rods.

8. A tie rod assembly for vehicle steering linkage according to claim 7 and including:
retaining means engaging said rods and constructed to prevent their radial displacement, said locking means being constructed to prevent axial displacement of said retaining means.

9. A tie rod assembly for a steering linkage comprising a first rod having a serrated portion and a lock-receiving recess spaced therefrom, a second rod with a serrated surface and a lock-receiving recess spaced therefrom, a first locking pin engaging the lock-receiving recess of said first rod and the serrated portion of said second rod, a second locking pin engaging the lock-receiving recess of said second rod and the serrated portion of said first rod, the thickness of said pins being substantially greater than the depth of said lock receiving recesses, said pins being formed of a material softer than said rods whereby it is permanently deformed when said pins are forced into engagement with said serrated surfaces.

10. A tie rod assembly for a steering linkage according to claim 9 and including:
retaining means engaging said rods and constructed to prevent their radial displacement.

11. A tie rod assembly for a steering linkage according to claim 9 and including:
retaining means engaging said rods and constructed to prevent their radial displacement, said first locking pin extending through said retaining means, said second locking pin extending through said retaining means, said pins being constructed to prevent axial displacement of said retaining means with respect to said rods.

* * * * *